United States Patent
Wang et al.

(10) Patent No.: US 9,143,726 B2
(45) Date of Patent: Sep. 22, 2015

(54) VIDEO MEDIA SERVER FOR REALIZING VIDEO INTERCOMMUNICATION GATEWAY FUNCTION AND VIDEO INTERCOMMUNICATION METHOD

(75) Inventors: Wenyuan Wang, Shenzhen (CN); Hong Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 966 days.

(21) Appl. No.: 13/375,428

(22) PCT Filed: May 7, 2010

(86) PCT No.: PCT/CN2010/072512
§ 371 (c)(1),
(2), (4) Date: Nov. 30, 2011

(87) PCT Pub. No.: WO2011/026339
PCT Pub. Date: Mar. 10, 2011

(65) Prior Publication Data
US 2012/0081507 A1    Apr. 5, 2012

(30) Foreign Application Priority Data

Sep. 3, 2009 (CN) .......................... 2009 1 0172918

(51) Int. Cl.
*H04N 7/14* (2006.01)
*H04M 3/51* (2006.01)

(52) U.S. Cl.
CPC *H04N 7/147* (2013.01); *H04M 3/51* (2013.01)

(58) Field of Classification Search
CPC ....................................................... H04N 7/14
USPC ................... 348/14.03, 14.11, 14.12, 14.09
See application file for complete search history.

(56) References Cited

U.S. PATENT DOCUMENTS

| | | | |
|---|---|---|---|
| 7,719,562 B2* | 5/2010 | Liu | 348/14.01 |
| 2008/0158336 A1* | 7/2008 | Benson et al. | 348/14.08 |

(Continued)

FOREIGN PATENT DOCUMENTS

| | | |
|---|---|---|
| CN | 101374330 A | 2/2009 |
| CN | 101459970 A | 6/2009 |

(Continued)

OTHER PUBLICATIONS

International Search Report for PCT/CN2010/072512 (in English) mailed on Aug. 19, 2010; ISA/CN.

*Primary Examiner* — Olisa Anwah
(74) *Attorney, Agent, or Firm* — Harness, Dickey & Pierce, PLC

(57) ABSTRACT

A certain embodiment of the invention provides a video media server (10) for implementing a video intercommunication gateway function and a video intercommunication method, the video media server (10) including: a video access control system module (11), which is configured to apply to the video media server (10) for a first video port supporting first coding and a second video port supporting second coding, complete media negotiation between the first video port and a call center (13), and complete media negotiation between the second video port and a video access network; a code converting module, which is configured to realize code conversion between the first video port and the second video port. The function of a video intercommunication gateway device is realized using a video media server (10) supporting the second coding multiplexing and demultiplexing function.

10 Claims, 4 Drawing Sheets

(56) References Cited

U.S. PATENT DOCUMENTS

| | | |
|---|---|---|
| 2009/0006533 A1 | 1/2009 | Guo |
| 2009/0303310 A1* | 12/2009 | Zhang et al. ............... 348/14.02 |
| 2011/0032880 A1* | 2/2011 | Ozawa ......................... 370/328 |
| 2011/0216203 A1* | 9/2011 | Tsumori et al. ............... 348/152 |

FOREIGN PATENT DOCUMENTS

| | | |
|---|---|---|
| CN | 101646055 A | 2/2010 |
| KR | 20090075334 A | 7/2009 |
| WO | 2008098247 A2 | 8/2008 |

* cited by examiner

US 9,143,726 B2

VIDEO MEDIA SERVER FOR REALIZING VIDEO INTERCOMMUNICATION GATEWAY FUNCTION AND VIDEO INTERCOMMUNICATION METHOD

CROSS-REFERENCE TO RELATED APPLICATIONS

This application is a U. S. National Stage Application of International application No. PCT/CN2010/072512, filed May 7, 2010 and published in Chinese as WO/2011/026339 on Mar. 10, 2011. This application claims the benefit of Chinese Application No. 200910172918.3, filed Sep. 3, 2009. The entire disclosures of the above applications are incorporated herein by reference.

TECHNICAL FIELD

The present invention relates to the communication field, and specifically to a video media server for implementing video intercommunication function and method for video intercommunication.

BACKGROUND OF THE RELATED ART

A call center, such as 1860 for telecom sector, 95555 for finance sector, also known as a customer service system, is an information system used to provide for customers a plurality of access approaches such as phone, fax, email and so on and mainly used to deal with requests, doubts, complains, propositions and questions proposed to an enterprise by the users. The core function of a call center is to implement various call operations (such as holding, consulting, meeting, single-step turn and other operations) to fulfill different kinds of demands for a customer to complete communication with an operator successfully. Presently, the call center only involves voice call, and all the communications between a user and an operator are through voice. Along with the progressive development of 3G ($3^{rd}$ Generation), the demand of video communication between a user and an operator becomes more and more urgent.

During the building of a 3G network, compatibility between all kinds of network elements and previous devices and protocols needs to be taken into consideration, which will be a long-time process, and it is difficult to obtain a desirable perfect video solution in a short time. For example, a call center uses RTP (Real-time Transport Protocol) to call media stream codes, but a video access network uses 324 M media stream codes (3G-324M is a frame protocol, which is adapted for wireless, mobile industries, and able to provide communication of sufficiently high quality for all kinds of applications sensitive to time delay, and able to realize real-time multimedia service in a wireless circuit exchange network such that video, audio, control signals and others are transmitted in the same 64 K physical link). It is well known that 324 M is not for media stream switch. After a video call accesses a call center, a request for media stream switch is bound to be made towards the video access network due to the special call flow and operation of the call center.

To solve the above problem, the most common method presently used in the industry is to add a device VIG (Video Intercommunication Gateway) to realize the intercommunication between a call center and a 3G network. Since a new network element is added in the network, associated problems such as maintenance cost, input cost, network complexity and so on will be brought along.

Accordingly, how to make a slight improvement based on the related art and realize a video intercommunication gateway with a video media server to thereby reduce network complexity becomes a problem to be considered by those skilled in the art.

SUMMARY OF THE INVENTION

A certain embodiment of the invention provides a video media server for implementing a video intercommunication gateway function and a video intercommunication method to realize video stream switch between a call center and a 3G network using a media server.

To solve the problem in the related art, a certain embodiment of the invention provides a video media server, which comprises a code converting module, along with a video access control system module, wherein, the video access control system module is configured to apply to the video media server for a first video port supporting first coding and a second video port supporting second coding, complete media negotiation between the first video port and a call center and complete media negotiation between the second video port and a video access network; and the code converting module is configured to realize code conversion between the first video port and the second video port;

thereby realizing video intercommunication between the video access network and the call center.

Preferably, in the video media server of a certain embodiment of the invention, the video access control system module may be further configured to re-complete the media negotiation between the call center and the first video port when the call center originates a media stream switch, and re-complete the media negotiation between the video access network and the second video port when the video access network originates a media stream switch.

Preferably, in the video media server of a certain embodiment of the invention, the video access control system module may comprise a logical control unit and a sip control unit; wherein, the logical control unit is configured to send logical control instructions after video access, the sip control unit is configured to: receive the logical control instructions, and according to the logical control instructions, apply to the video media server for the first video port supporting the first coding and the second video port supporting the second coding, complete the media negotiation between the first video port and the call center, and complete the media negotiation between the second video port and the video access network.

Preferably, in the video media server of a certain embodiment of the invention, the sip control unit may comprise:

an applying unit, which is configured to apply to the video media server for the first video port supporting the first coding and the second video port supporting the second coding;

a control unit, which is configured to complete the media negotiation between the first video port, and complete the call center and the media negotiation between the second video port and the video access network.

Preferably, in the video media server of a certain embodiment of the invention, the logical control unit may be further configured to send a request to the sip control unit to request applying for the first video port to the video media server and originating a video call to the call center;

the sip control unit may be further configured to send an invite message without media information to the video media server; originate the video call, which carries a message comprising media information of the first video port, to the call center after successful application of the first video port; and send a negotiation success message of the first video port to the video media server and the logical control unit after receiving media information of the call center returned by the call center after receiving the video call;

the video media server may be configured to assign the first video port supporting the first coding and return the media information of the first video port to the sip control unit after receiving the invite message.

Preferably, in the video media server of a certain embodiment of the invention, the logical control unit may be further configured to send to the sip control unit a message for applying for the second video port after receiving the negotiation success message of the first video port;

the sip control unit may be further configured to send to the video media server a request message for applying for the second video port carrying user port media information after receiving the message for applying for the second video port; and send a negotiation success message of the second video port, which comprises media information of the second port, to the video access network and the logical control unit after successful application of the second video port;

the video media server may be further configured to assign the second video port supporting the second coding and return the media information of the second video port to the sip control unit after receiving the request message for applying for the second video port.

A certain embodiment of the invention also provides a method for video intercommunication, comprising:

applying to a video media server for a first video port supporting first coding and a second video port supporting second coding;

completing media negotiation between the first video port and a call center and completing media negotiation between the second video port and a video access network; and after a video call arrives at the video access network, a video media stream entering the second video port through the video access network and then arriving at the call center through the first video port.

Preferably, the video intercommunication method of a certain embodiment of the invention may further comprise:

re-completing the media negotiation between the call center and the first video port when the call center originates a media stream switch, and re-completing the media negotiation between the video access network and the second video port when the video access network originates a media stream switch.

A certain embodiment of the invention also provides a video access control system, comprising a logical control unit and a sip control unit;

the logical control unit configured to send logical control instructions after video access;

the sip control unit configured to receive the logical control instructions, and according to the logical control instructions, apply to the video media server for a first video port supporting first coding and a second video port supporting second coding, complete media negotiation between the first video port and a call center, and complete media negotiation between the second video port and video access network.

Preferably, in the video access control system of a certain embodiment of the invention, the sip control unit may comprise:

an applying unit, which is configured to apply to the video media server for the first video port supporting the first coding and the second video port supporting the second coding;

a control unit, which is configured to complete the media negotiation between the first video port and the call center, and complete the media negotiation between the second video port and the video access network.

By providing a video access control system module in a certain embodiment of the invention, the video access control system module applies to the video media server for a first video port supporting the first coding and a second video port supporting the second coding. When the call center side originates a media stream switch, the video access control system module is responsible for controlling and notifying the first video port and the second video port of the video media server, and completing media switch of the two ports inside the video media server. Therefore, implementation the function of a VIG device is realized using a video media server supporting the second coding multiplexing and demultiplexing function, such that a video call is conveniently accessible to a call center. In the present invention, the existing network resources can be used sufficiently, the network structure is simple, and the problem of media stream creation and multiple times of switch after a video call accesses into a call center is perfectly solved without addition of other network elements or increase of operation cost, thereby improving user satisfaction and market share of business, which has apparent economic benefit and social benefit.

PREFERRED EMBODIMENTS OF THE PRESENT INVENTION

The video media servers described herein are all video media servers having the second coding demultiplexing function.

The core concept of the invention is to add a video access control system module, which applies for a first video port supporting the first coding and a second video port supporting the second coding to the video media server, and completes media negotiation between the first video port and the call center and media negotiation between the second video port and the video access network. A video media stream enters the second video port through the video access network and then arrives at the call center via the first video port, thereby enabling the video media server of the invention to implement video intercommunication function.

Preferably, when the call center originates a video stream switch, the media negotiation between the call center and the first video port, is re-implemented. Therefore, the media stream switch function after a video accesses is implemented under control of a video access control system module.

The technical scheme of the present invention will be further described below with reference to the drawings and preferred embodiments.

Figure 1:
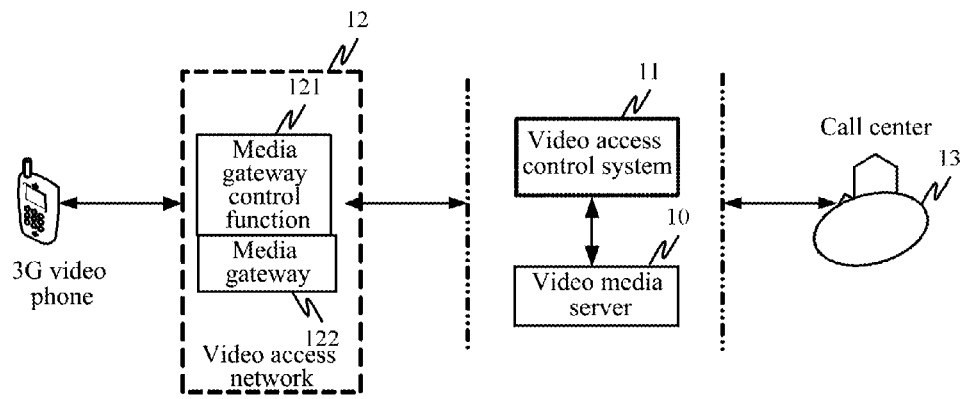
FIG. 1 illustrates the structure of the network system according to the present invention.

With reference to FIG. 1, it illustrates the structure of the network system of the invention.

A specific embodiment of the invention is to add a VACS (Video Access Control System) module 11, which is responsible for the control function of video streams of both sides after the video accesses.

The video access control system module 11 is configured to apply a first video port supporting the first coding and a second video port supporting the second coding to the video media server, and complete media negotiation between the first video port and the call center and media negotiation between the second video port and the video access network.

Just as a slight clarification the video media server includes a code converting module, which is configured to accomplish code conversion between the first video port and the second video port.

The video access control system module 11 is also configured to re-complete the media negotiation between the call center and the first video port when the call center side originates a media stream switch, and re-complete the media negotiation between the video access network and the second video port when the video access network originates a media stream switch.

FIG. 1 describes the location of VACS module 11 in the system. A video call is originated by a video access network 12 and enters a call center system 13 via the VACS module 11 and a video media server 10. As could be seen from the diagram, the video access network 12 includes a MGCF (media gateway control function) unit 121 and a MGW (media gateway) 122.

Figure 2A:
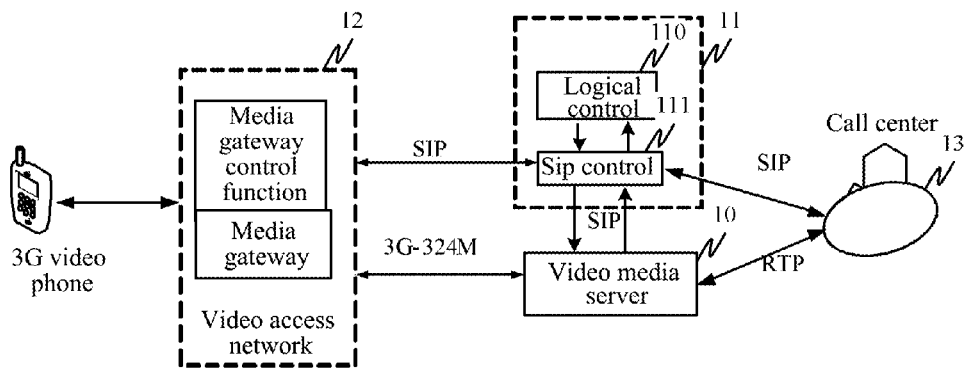
FIG. 2A illustrates the structure of the system for media stream control according to the present invention.

Specifically, the VACS module 11 is composed of a LC (logical control) unit 110 and a SC (sip control) unit 111 (as shown in FIG. 2A).

The LC unit 10 is configured to send a logical control instruction after video access, and perform logical control after the video access, and ensure that the call enters the call center according to a designated flow, and implement accurately possible subsequent video stream switch between the video access network and the call center.

The SC unit 11 is configured to receive the logical control instruction, and according to the logical control instruction, apply the first video port supporting the first coding and the second video port supporting the second coding to the video media server, and complete the media negotiation between the first video port and the call center and the media negotiation between the second video port and the video access network.

Specifically, the SC unit 11 is used to convert a flow designated by the logical control instruction of the LC unit 10 to SIP (session initiation protocol) to complete a specific message exchange for the video access network and the call center. The exchanged message body and operation code are entirely in conformity with the standard SIP to ensure accomplishment of a smooth seamless access without any change to the devices in the video access network and the call center. The logical control unit flow is converted to session initiation protocol to realize port application, assembling, transmitting and receiving of the session initiation protocol.

In a preferred embodiment of the invention, the logical control unit is further controlled to send a request to the sip control unit to request the application to the video media server for the first video port and origination of a video call for the call center. Accordingly, the sip control unit is further configured to send an invite message without media information to the video media server; originate the video call, which carries a message including the media information of the first video port, to the call center after successful application of the first video port; and send a negotiation success message of the first video port to the video media server and the logical control unit after receiving the media information of the call center returned from the call center after receiving the video call.

The video media server is configured to assign the first video port supporting the first coding and return the media information of the first video port to the sip control unit after receiving the invite message.

In another preferred embodiment of the invention, the logical control unit is further configured to send to the sip control unit a message for applying for the second video port after receiving the negotiation success message of the first video port;

the sip control unit is further configured to send to the video media server a request message for applying for the second video port carrying user port media information after receiving the message for applying for the second video port; and send a negotiation success message of the second video port, which comprises the media information of the second port, to the video access network and the logical control unit after successful application of the second video port;

the video media server is configured to assign the second video port supporting the second coding and return the media information of the second video port to the sip control unit after receiving the request message for applying for the second video port.

Furthermore, the sip control unit 111 includes:

an applying unit, which is configured to apply to the video media server for the first video port supporting the first coding and the second video port supporting the second coding;

a control unit, which is configured to complete the media negotiation between the first video port and the call center, and the media negotiation between the second video port and the video access network.

Figure 2B:
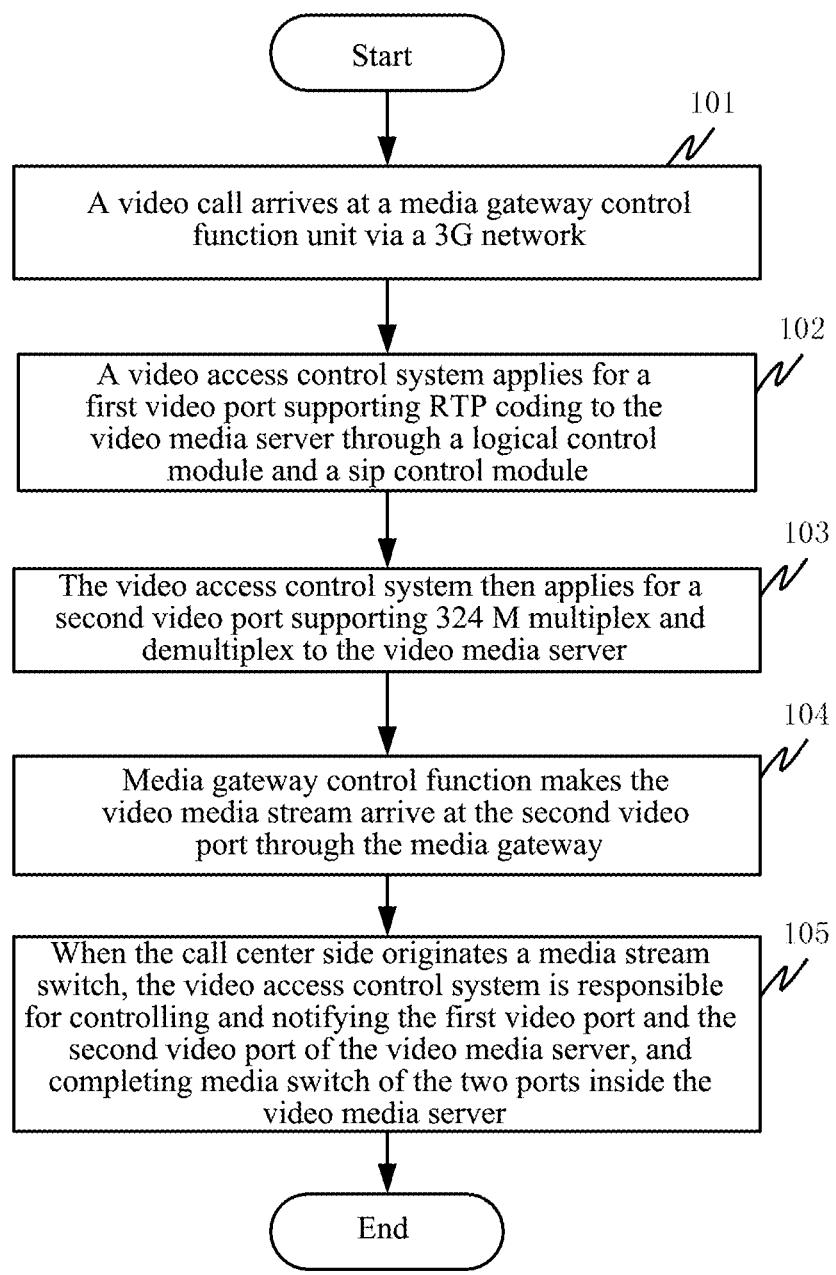
FIG. 2B is a flowchart of the first example of the method for implementing media stream control according to the present invention.

As shown in FIG. 2A and FIG. 2B, a system structure diagram for the media stream control of the invention and a flow chart of the first embodiment of the method for implementing media stream control are illustrated. As shown in FIG. 2B, the method includes the following steps.

Step 101, after a video call arrives at MGCF (media gateway control function) unit via a 3G network, the video call in the wireless circuit exchange network is converted. Video signaling is converted to standard SIP signaling, and a media stream of the video is converted to the second coding by a MGW.

Step 102, after the SIP signaling of the video call is sent to a VACS, the VACS applies for the first video port supporting the first coding to the video media server through a LC module and a SC module, and simultaneously uses the coding information provided by the first video port to originate a video call to the call center.

Step 103, when the call center rings, the VACS is informed through ringing operation of a SIP message, at which moment, the VACS applies the second video port supporting the second coding multiplexing and demultiplexing to the video media server again, and simultaneously returns the coding information of the second video port to a MGCF via ringing.

Step 104, after receiving the ringing message, the MGCF obtains the second video port supporting the second coding provided by the VACS, and subsequently the MGCF transmits the video media stream to the second video port through the MGW.

Step 105, when the call center side originates a media stream switch, the VACS is responsible for controlling and notifying the first video port and the second video port of the video media server, and completing media switch of the two ports inside the video media server, i.e. if the RTP coding and decoding of the first video port change, the video media server converts the changed coding and decoding into the second coding video stream (the second coding has no change) that is previously consulted, and completes the conversion between the RTP media stream and the second coding video stream. In this way, the video stream switch function after video access is implemented under control of the VACS.

Figure 2C:
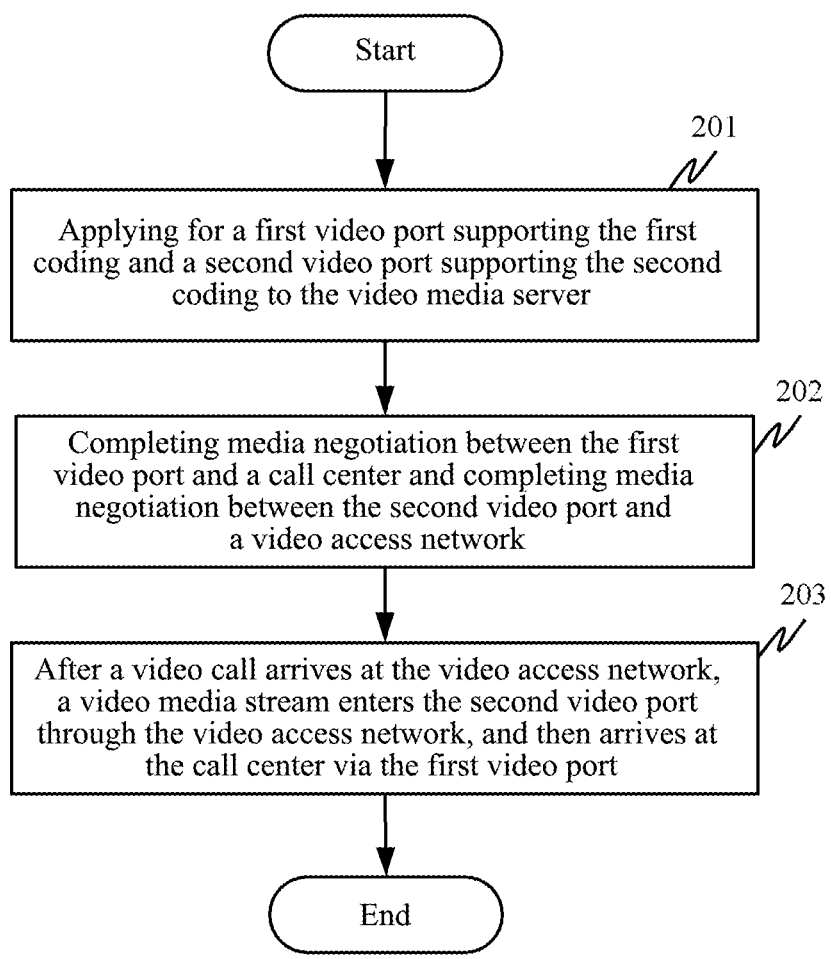
FIG. 2C is a flowchart of the second example of the method for implementing media stream control according to the present invention.

As shown in FIG. 2C, it illustrates a flow chart of the second embodiment of the method for implementing media stream control. The method includes the following steps:

Step 201, the first video port supporting the first coding and the second video port supporting the second coding are applied at the video media server;

Step 202, the media negotiation between the first video port and the call center and the media negotiation between the second video port and the video access network are completed;

Step 203, after a video call arrives at video access network, a video media stream enters passes the second video port through the video access network, and then arrives at the call center via the first video port.

In a preferred embodiment of the invention, the method further includes the following steps:

when the call center side originates a media stream switch, re-completing the media negotiation between the call center and the first video port;

when the video access network originates a media stream switch, re-completing the media negotiation between the video access network and the second video port.

In a preferred embodiment of the invention, the first coding is RTP code, and the coding is 324 M coding. Of course, the invention is not limited to a specific coding mode, and any coding mode that can realize the purpose of the invention may be adopted in the invention.

The technical scheme of the invention will be illustratively described below through an example in a specific application.

Figure 3:
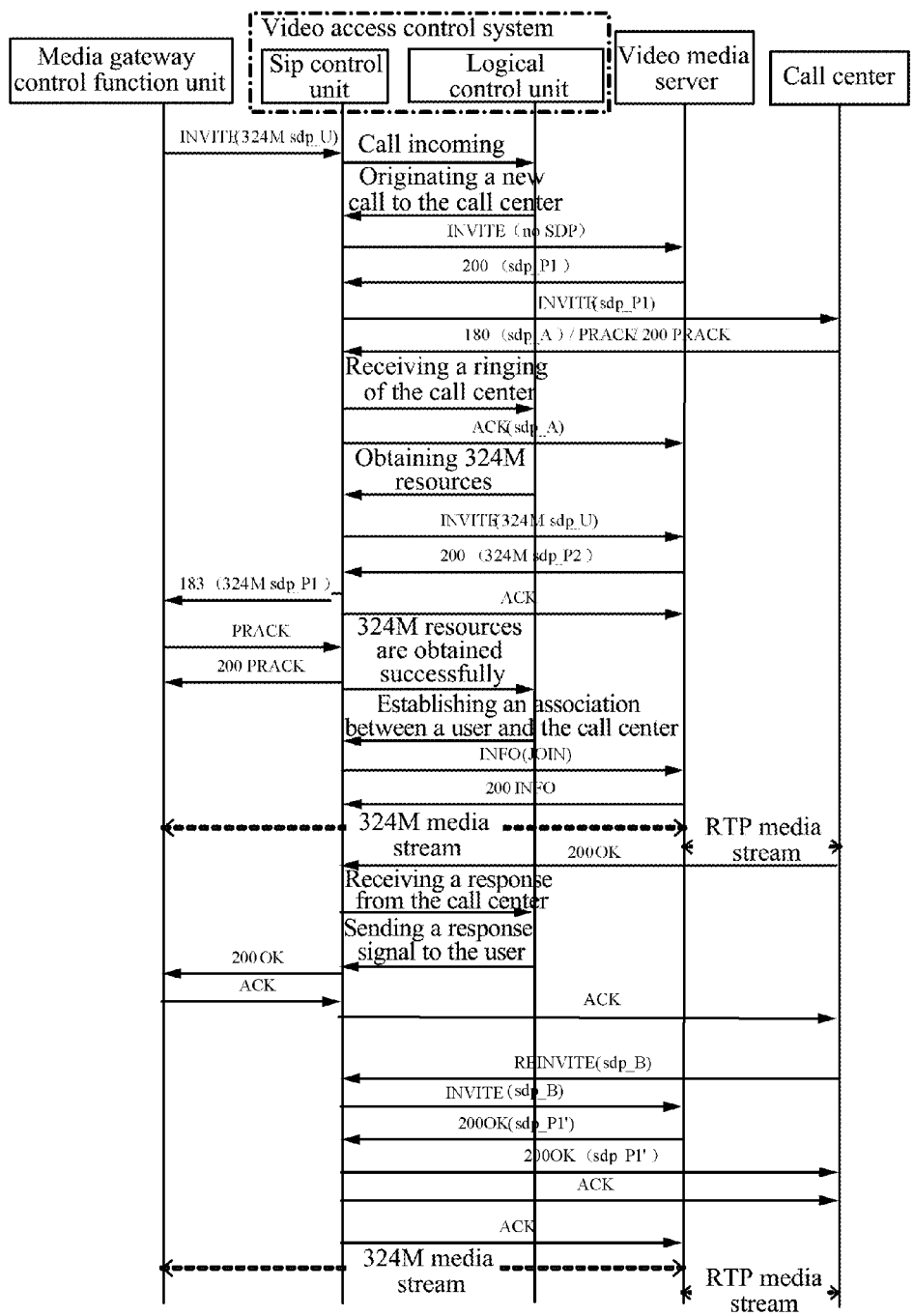
FIG. 3 is a flowchart of a video call controlled by VACS according to an application example of the invention.

As shown in FIG. 3, it is a flowchart of a video call controlled by a VACS in an application example of the invention.

In FIG. 3, the method for implementing creation and switch of the RTP and the second coding media stream through a video media server under control of a VACS according to the present invention is described in detail by taking a video call accessing into a call center as an example. Wherein, the second coding SDP_U indicates the user SDP (session description protocol) media information carrying the second coding, SDP_A indicates the SDP media information of the call center, and SDP_P1, SDP_P2 indicate media information of the ports of the video media server.

Step 301, when a video call comes in, the MGCF sends to the SC module of the VACS an invite message, which simultaneously carries associated media stream information of the second coding (associated media information is the second coding SDP_U). The SC module sends to the LC module a call incoming message to notify the video call carrying the second coding to access.

Step 302, the LC sends to SC module a message for starting to originate a call to the call center to request applying for a RTP port to the video media server and begins a video call to the call center.

Step 303, the SC module sends an invite message without SDP to the video media server, and then the video media module assigns a RTP port (associated media information is SDP_P1) which is returned to the SC module through a 200 OK message, and the SC module then originates an operation of calling the call center with a video call, and sends an invite message with the media information SDP_P1 to the call center.

Step 304, after receiving the message, the call center will return to the SC module a ringing message together with the associated message SDP_A of the call center, i.e. 183 message with SDP_A.

Step 305, after receiving the 183 message from the opposite end, the SC module sends to the video media server a 200 OK message indicating that sip case for the video media server of this time is completed, and simultaneously sends to the LC module a message indicating the call center beings to ring.

Step 306, after receiving the ringing, it is indicated that the call originated by the LC has received a ringing case, and at this moment, the LC module re-originates a message for applying for the second coding resources.

Step 307, after receiving the message for applying for the second coding resource from the LC, the SC module originates an invite message for applying for a port to the video media server, and the media information is the second coding SDP_U. The media server returns a new port P2 through a 200 OK message, and the media information is the second coding SDP_P2.

Step 308, after receiving the message indicating successful application of the second coding resources from the video media server, the SC module sends to the MGCF a 183 ringing message, in which the associated media information carried is the second coding SDP_P2. Simultaneously, the SC module sends to LC a resource application success message.

Step 309, after receiving the resource application success message sent by the SC, which indicates that the MGCF has obtained the second coding SDP_P2 information of the video media server, the LC then builds an association between a user and the call center, and controls the video media server, through the SC, to associate SDP_P1 (RTP) with SDP_P2 (the second coding), thereby realizing intercommunication of two different types of media formats using the second coding multiplexing and demultiplexing function of the video media server.

Step 310, the video call has now built a complete media stream with the call center, and a mutual video between a video user and a call center operator is built successfully.

Step 311, after receiving 200 OK response information from the call center, the SC notifies the LC. The LC controls the SC to send a response message to the MGCF by sending a response message to the SC. The event of video call is now created successfully.

Step 312, if the call center originates a media stream switch, the SC only needs to make media negotiation between the call center and SDP_P1, and the MGCF does not make media stream switch any more.

Presently a video media server which supports video is always used in a video call center. If the video media server has the function of multiplexing and demultiplexing the second coding, it is completely possible to use the video media server to fulfill the VIG function, which can reduce the investment of an operator, and improve user satisfaction. The invention mainly uses a video media server with the second coding demultiplexing function to complete the media stream switch between a call center and an access network and thereby implement the function of a VIG device. For hardware configuration, the video access control system module disclosed in the invention may be disposed in a video media server, and also may be disposed separately from the video media server.

It should be pointed out that although the examples in the above specific steps are very specific, they should not be regarded as a limit to the protection scope of the invention, which, instead, should be defined by the attached claims.

INDUSTRIAL APPLICABILITY

Compared with the related art, the invention is able to sufficiently use the current network resources, the network structure is simple, and the problem of media stream creation and multiple times of switch after a video call accesses into a call center is perfectly solved without addition of other network elements or increase of operation cost, thereby improving user satisfaction and market share of business, which has apparent economic benefit and social benefit.

What is claimed is:

1. A video media server, which comprises a code converting module, along with a video access control system module, wherein,
    the video access control system module is configured to apply to the video media server for a first video port supporting first coding and a second video port supporting second coding, complete media negotiation between the first video port and a call center and complete media negotiation between the second video port and a video access network; and
    the code converting module is configured to realize code conversion between the first video port and the second video port;
    thereby realizing video intercommunication between the video access network and the call center.

2. The video media server according to claim 1, wherein, the video access control system module is further configured to re-complete the media negotiation between the call center and the first video port when a call center side originates a media stream switch, and re-complete the media negotiation between the video access network and the second video port when the video access network originates a media stream switch.

3. The video media server according to claim 1, wherein, the video access control system module comprises a logical control unit and a sip control unit;
    wherein, the logical control unit is configured to send logical control instructions after video access;
    the sip control unit is configured to: receive the logical control instructions, and according to the logical control instructions, apply to the video media server for the first video port supporting the first coding and the second video port supporting the second coding, complete the media negotiation between the first video port and the call center, and complete the media negotiation between the second video port and the video access network.

4. The video media server according to claim 3, wherein, the sip control unit comprises:
    an applying unit, which is configured to apply to the video media server for the first video port supporting the first coding and the second video port supporting the second coding;
    a control unit, which is configured to complete the media negotiation between the first video port and the call center, and complete the media negotiation between the second video port and the video access network.

5. The video media server according to claim 3, wherein, the logical control unit is further configured to send a request to the sip control unit to request applying for the first video port to the video media server and originating a video call to the call center;
    the sip control unit is further configured to send an invite message without media information to the video media server; originate the video call, which carries a message comprising media information of the first video port, to the call center after successful application for the first video port; and send a negotiation success message of the first video port to the video media server and the logical control unit after receiving media information of the call center returned by the call center after receiving the video call;
    the video media server is configured to assign the first video port supporting the first coding and return the media information of the first video port to the sip control unit after receiving the invite message.

6. The video media server according to claim 5, wherein,
    the logical control unit is further configured to send a message for applying for the second video port to the sip control unit after receiving the negotiation success message of the first video port;
    the sip control unit is further configured to send a request message for applying for the second video port carrying user port media information to the video media server after receiving the message for applying for the second video port; and send a negotiation success message of the second video port, which comprises media information of the second video port, to the video access network and the logical control unit after successful application for the second video port;
    the video media server is further configured to assign the second video port supporting the second coding and return the media information of the second video port to the sip control unit after receiving the request message for applying for the second video port.

7. A method for video intercommunication, comprising:
    applying to a video media server for a first video port supporting first coding and a second video port supporting second coding;
    completing media negotiation between the first video port and a call center and completing media negotiation between the second video port and a video access network; and
    after a video call arrives at the video access network, a video media stream entering the second video port through the video access network and then arriving at the call center through the first video port.

8. The method according to claim 7, further comprising:
    re-completing the media negotiation between the call center and the first video port when a call center side originates a media stream switch; and
    re-completing the media negotiation between the video access network and the second video port when the video access network originates a media stream switch.

9. A video access control system, comprising a logical control unit and a sip control unit;
    the logical control unit configured to send logical control instructions after video access;
    the sip control unit configured to receive the logical control instructions, and according to the logical control instructions, apply to a video media server for a first video port supporting first coding and a second video port supporting second coding, complete media negotiation between the first video port and a call center, and complete media negotiation between the second video port and a video access network.

10. The video access control system according to claim 9, wherein, the sip control unit comprises:
   an applying unit, which is configured to apply to the video media server for the first video port supporting the first coding and the second video port supporting the second coding;
   a control unit, which is configured to complete the media negotiation between the first video port and the call center, and complete the media negotiation between the second video port and the video access network.

* * * * *